(12) United States Patent
Lindgren et al.

(10) Patent No.: US 8,145,399 B2
(45) Date of Patent: Mar. 27, 2012

(54) METHOD FOR INSTRUCTING A COLLECTIVE GEAR SHIFT REQUEST IN A GEAR BOX AND A METHOD FOR COMMUNICATING A GEAR SHIFT INSTRUCTION TO A GEAR BOX

(75) Inventors: Anders Lindgren, Göteborg (SE); Anders Eriksson, Torslanda (SE)

(73) Assignee: Volvo Lastvagnar AB, Göteborg (SE)

(*) Notice: Subject to any disclaimer, the term of this patent is extended or adjusted under 35 U.S.C. 154(b) by 960 days.

(21) Appl. No.: 12/066,270

(22) PCT Filed: May 22, 2006

(86) PCT No.: PCT/SE2006/000601
§ 371 (c)(1),
(2), (4) Date: Jun. 10, 2008

(87) PCT Pub. No.: WO2007/030046
PCT Pub. Date: Mar. 15, 2007

(65) Prior Publication Data
US 2009/0222181 A1    Sep. 3, 2009

Related U.S. Application Data

(60) Provisional application No. 60/596,213, filed on Sep. 8, 2005.

(51) Int. Cl.
*G06F 7/00* (2006.01)

(52) U.S. Cl. ........ 701/64; 477/79; 477/81; 477/96; 477/99; 477/138; 74/365; 74/473.12; 74/473.21; 74/335

(58) Field of Classification Search .......... 701/64; 477/79, 81, 96, 99, 138; 74/365, 473.12, 74/335, 473.21
See application file for complete search history.

(56) References Cited

U.S. PATENT DOCUMENTS
5,816,100 A * 10/1998 Fowler et al. .......... 74/335
(Continued)

FOREIGN PATENT DOCUMENTS
DE    10127762 A1    9/2002
(Continued)

OTHER PUBLICATIONS

International Search Report for corresponding International Application PCT/SE2006/000601.
(Continued)

*Primary Examiner* — Thomas Black
*Assistant Examiner* — Luke Huynh
(74) *Attorney, Agent, or Firm* — WRB-IP LLP

(57) ABSTRACT

Method and arrangement for providing an electronic gear shift selector associated with an automatic mechanical transmission for a heavy vehicle. The gear shift selector includes a toggle switch for asserting at least one gear shift request, a counter receiving the at least one gear shift request, and a time delay for preventing communication of the at least one gear shift request from the counter until a predefined time period has passed. A method for communicating a collective gear shift request to a gear box includes asserting one or more gear shift requests with a gear shift selector, communicating the gear shift requests to a counter, determining the collective gear shift requests occurring within a predefined time period, communicating the gear shift requests occurring within the predefined time period to a gearbox.

10 Claims, 4 Drawing Sheets

U.S. PATENT DOCUMENTS

| | | | |
|---|---|---|---|
| 6,145,398 A * | 11/2000 | Bansbach et al. | 74/335 |
| 6,487,484 B1 * | 11/2002 | Shober et al. | 701/51 |
| 7,139,653 B2 * | 11/2006 | Ringger et al. | 701/51 |
| 2001/0025538 A1 | 10/2001 | Poljansek et al. | |
| 2004/0266583 A1 | 12/2004 | Henneken et al. | |

FOREIGN PATENT DOCUMENTS

| | | |
|---|---|---|
| DE | 102004013210 A1 | 10/2005 |
| EP | 0327350 A1 | 8/1989 |
| EP | 1132654 A2 | 9/2001 |
| EP | 1229272 A2 | 8/2002 |
| WO | 0123787 A1 | 4/2001 |

OTHER PUBLICATIONS

International Preliminary Report on Patentability for corresponding International Application PCT/SE2006/000601.

Supplementary European Search Report corresponding EP 06 73 3427.

* cited by examiner

METHOD FOR INSTRUCTING A COLLECTIVE GEAR SHIFT REQUEST IN A GEAR BOX AND A METHOD FOR COMMUNICATING A GEAR SHIFT INSTRUCTION TO A GEAR BOX

The present application is a U.S. national stage application of PCT/SE2006//000601, filed May 22, 2006, which claims priority to U.S. Provisional Application No. 60/596,213, filed Sep. 8, 2005.

BACKGROUND AND SUMMARY

The present invention relates to automatic mechanical transmissions (AMT) of vehicles and more specifically, to an automatic manual transmission gear shift assembly including a timed shift delay for vehicles such as tractor trailers, heavy duty trucks, buses and the like.

Automatic mechanical transmissions of the stage-geared gearbox type have become increasingly common in tractor trailers and heavy-duty vehicles as microcomputer technology has continued to advance and has made it possible, with a control computer and a number of control elements, e.g., servo motors, to precision-control the engine speed, the connection and disconnection of an automated clutch between engine and gearbox, and coupling members of the gearbox, relative to one another, so that smooth gearshifts are obtained at the correct speeds. The advantage of these types of automatic gearboxes, when compared with traditional automatic gearboxes constructed with planetary gear steps and with hydrodynamic torque converters on the input side, is that first, such devices are simpler, more robust, and can be produced at substantially lower costs than the traditional automatic gearboxes, and second, the gearboxes have greater efficiencies, meaning lower fuel consumption for the incorporating vehicle. Typically, control of these gearboxes is provided by means of a gear shifting selector electronically linked to the gearbox.

A known solution uses a gear selector that is fixed to the seat. On the side of the selector facing the driver's seat is a +/− button, in a toggle-type switch configuration, with up and down spring back positions, as well as a neutral position in the middle. Besides the toggle-type switch configuration which is shown, it is also contemplated that among other designs, a configuration using two distinct +/− push buttons may be utilized.

As shown, on top of the gear selector is a button that is used to tilt the gear selector to the horizontal position. On the front is a gear selector lock which must be pressed in order to change the gears from neutral to reverse, neutral to drive and manual to "limp home".

The gear selector may also be used to choose between a number of different driving programs including, but not limited to reverse, neutral, automatic, manual, economy, power, and the like. When in the automatic and manual programs, the operator of the vehicle may select a desired gear by pressing the +/− button of the selector and the +/− button may be used to change gears one step at a time during manual gear changing, manually change a gear one step when in automatic gear changing, manually change a gear one step when in neutral.

While there are many other advantageous features of the known solution gear selector, one problem is that it does not allow an operator to skip between gears. That is, if an operator desires to shift between nonconsecutive gears, for example, from third gear to fifth gear, the operator must press the +/− button twice. After the +/− button is pressed the first time, the gear shift automatically begins to direct the gearbox to shift to fourth gear and after the +/− button is pressed the second time, the gearbox is then directed to shift to fifth gear. This is problematic because the first gear shift request must be interrupted by the second gear request and can cause gearshift delay and generally result in an undesirable gearshift transition.

The present invention recognizes the need for an electronic gear shift selector that allows an operator to skip directly between non-consecutive gears without having to interrupt a first gear shift request.

In at least one embodiment, the present invention takes the form of an electronic gear shift selector toggle switch, or button, that includes a counter and time delay circuit to allow an operator to shift directly between non-consecutive gears. The shift is implemented once the time delay circuit determines that the appropriate period of time has passed since the last activation of the toggle switch. The system detects, and a counter registers (counts) the number of times the toggle switch is asserted and the time delay circuit is configured to delay the communication of the number of assertions until a predetermined period of time has lapsed. The counter is preferably software based, but it is also contemplated that the counter may be a hardware based counter of known design. In one embodiment, the time delay circuit delays communication of the number of assertions between 0.3 and 1 second after the toggle switch is first asserted. In another embodiment, if a second assertion is detected within a predetermined time period, the time delay circuit is reset and communication of the number of assertions is delayed a further period of between 0.1 and 0.5 second thereafter.

In still yet another embodiment, assertion of the toggle switch a predetermined number of times, holding the toggle switch in the asserted position, or combinations thereof can be used to cancel a gear shift request. Similarly, assertion of the toggle switch a predetermined number of times, holding the toggle switch in the asserted position, or combinations thereof can be used to automatically cycle through the gears without having to continually individually assert the toggle switch to cycle through gears. This feature, in a preferred embodiment, displays the selected gear on a driver display and allows the driver to select the desired gear directly. Additionally, the selection of a particular gear is relayed to the driver through an audible signal. In a preferred embodiment, the selection of a particular gear is limited so as to prevent engine overspeed or lugging. Another embodiment is when the + side of the toggle switch is depressed in such a fashion that it causes the transmission to shift to the highest gear, and when the − side of the toggle switch is depressed in such a fashion that it causes the transmission to shift to the lowest gear.

BRIEF DESCRIPTION OF THE DRAWINGS

The present invention will now be more fully described, by way of example, with reference to the accompanying drawing in which.

DETAILED DESCRIPTION

Figure 1:
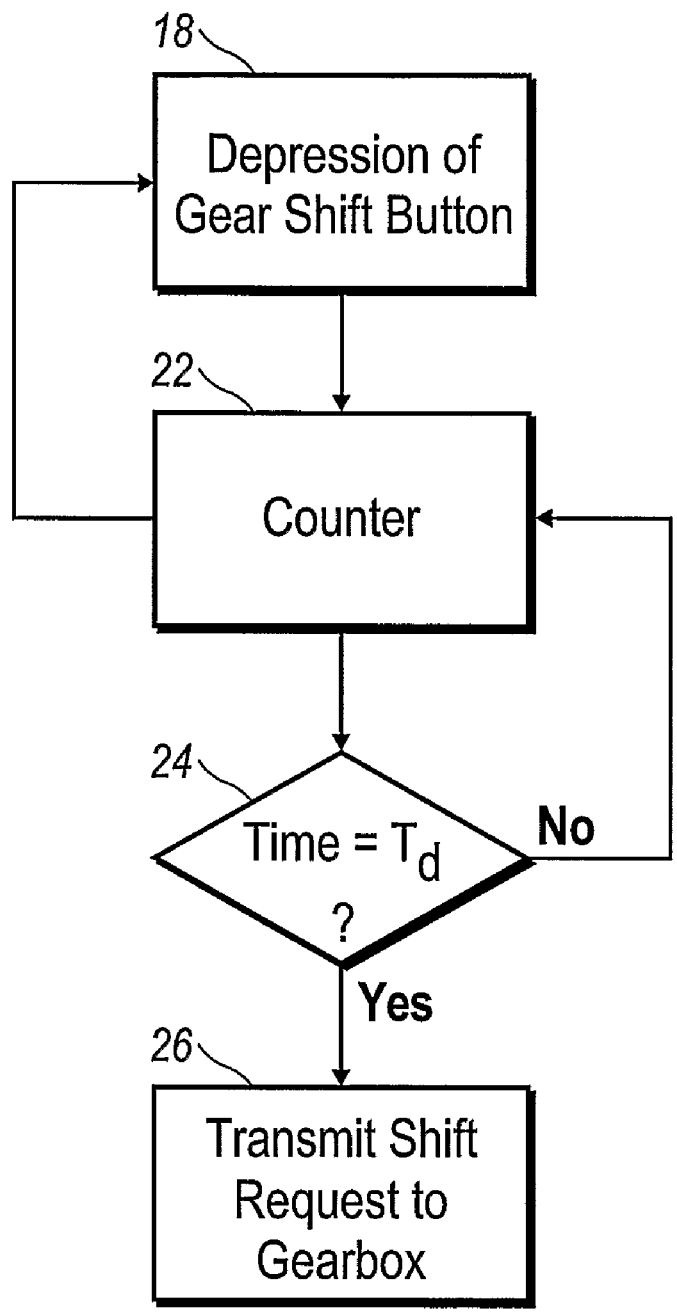
FIG. 1 illustrates a flow diagram of one method communicating between a gear shift selector and a gear box.

The present invention will now be described and disclosed in greater detail, and with reference to the figures. It is to be understood, however, that the disclosed embodiments are merely exemplary of the invention and that the invention may be embodied in various and alternative forms. It should also be understood that the accompanying figures are not necessarily to scale and some features may be exaggerated, or minimized, to show details of particular components. Therefore, specific structural and functional details disclosed herein are not to be interpreted as limiting the scope of the claims, but are merely provided as an example to teach one having ordinary skill in the art to make and use the invention. It should also be appreciated that in the detailed description that follows, like reference numerals on different drawing views are intended to identify like structural elements. It should be further appreciated that with respect to the present detailed description and claims, the gear shift selector is described as employing typical software for control and diagnosis on the vehicle, but it should also be understood that one or more electronic circuits may be likewise employed for the purpose.

Figure 2:
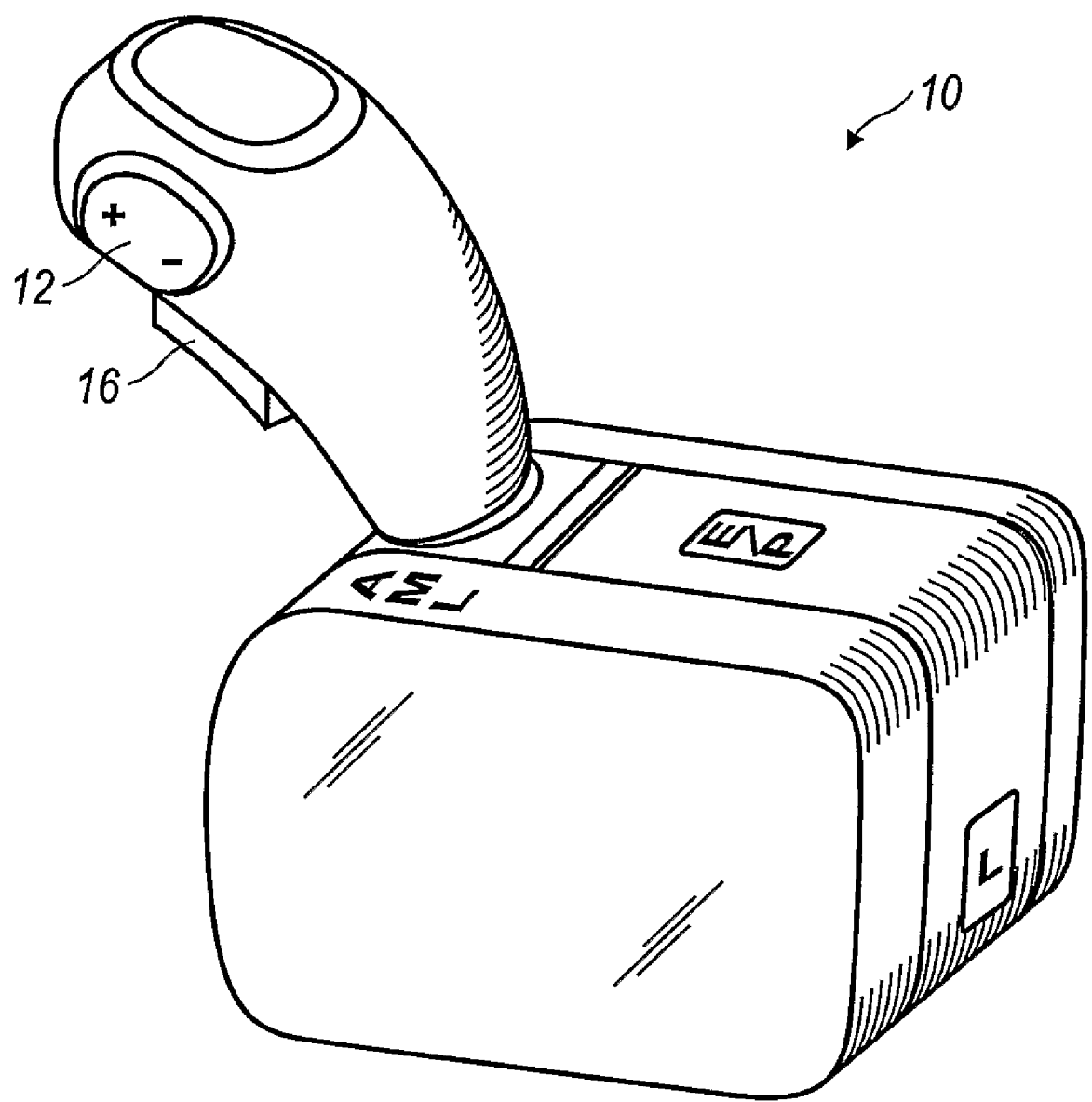
FIG. 2 illustrates a gear shift selector configured according to the invention.

Referring now to FIG. 2, gear shift selector 10 is electronically linked with a gearbox of a vehicle and preferably including an AMT type transmission (not shown). Gear shift selector 10 is seen as broadly comprising gear shift button 12 (also referred to as toggle switch), and selector lock button 16. Gear shift button 12 is provided for manually changing the gears of the vehicle. Selector lock button 16 is provided for preventing inadvertent engagement of a gear.

As previously discussed above, in order to shift between non-consecutive gears utilizing a gear shift selector electronically linked to a gearbox, a gear shift button (+/− button) was required to be pressed a number of times corresponding to the number of gear shifts. Upon asserting the gear shift button a first time, known gearboxes begin to shift to the next consecutive gear until being interrupted by the assertion of the gear shift button a subsequent time. As illustrated in FIG. 1, according to the present invention, when the gear shift button 12 is asserted (block 18) and such is detected by the system, the request is not immediately communicated to the gearbox; instead, a time delay (block 24) and a counter (block 22) are used to track the time from the first or last depression of the toggle switch and the number of depressions during the given period of time, respectively. Then the transmission controller will cause the gearbox to engage in a number of shifts (block 26).

In a preferred embodiment, the transmission will just engage the highest/lowest gear requested. Thus if an upshift of three gears is requested, the transmission will only issue a command at the end when a signal is received from the time delay and counter to engage the gear that is three gears higher than the currently engaged gear. As mentioned previously, the time delay (block 24) and counter (block 22) are implemented in the software controller of the AMT, but the time delay (block 24) and counter (block 22) can be hardware based. Several illustrative embodiments are described below, but other combinations are considered within the scope of the disclosure as well.

Figure 3:
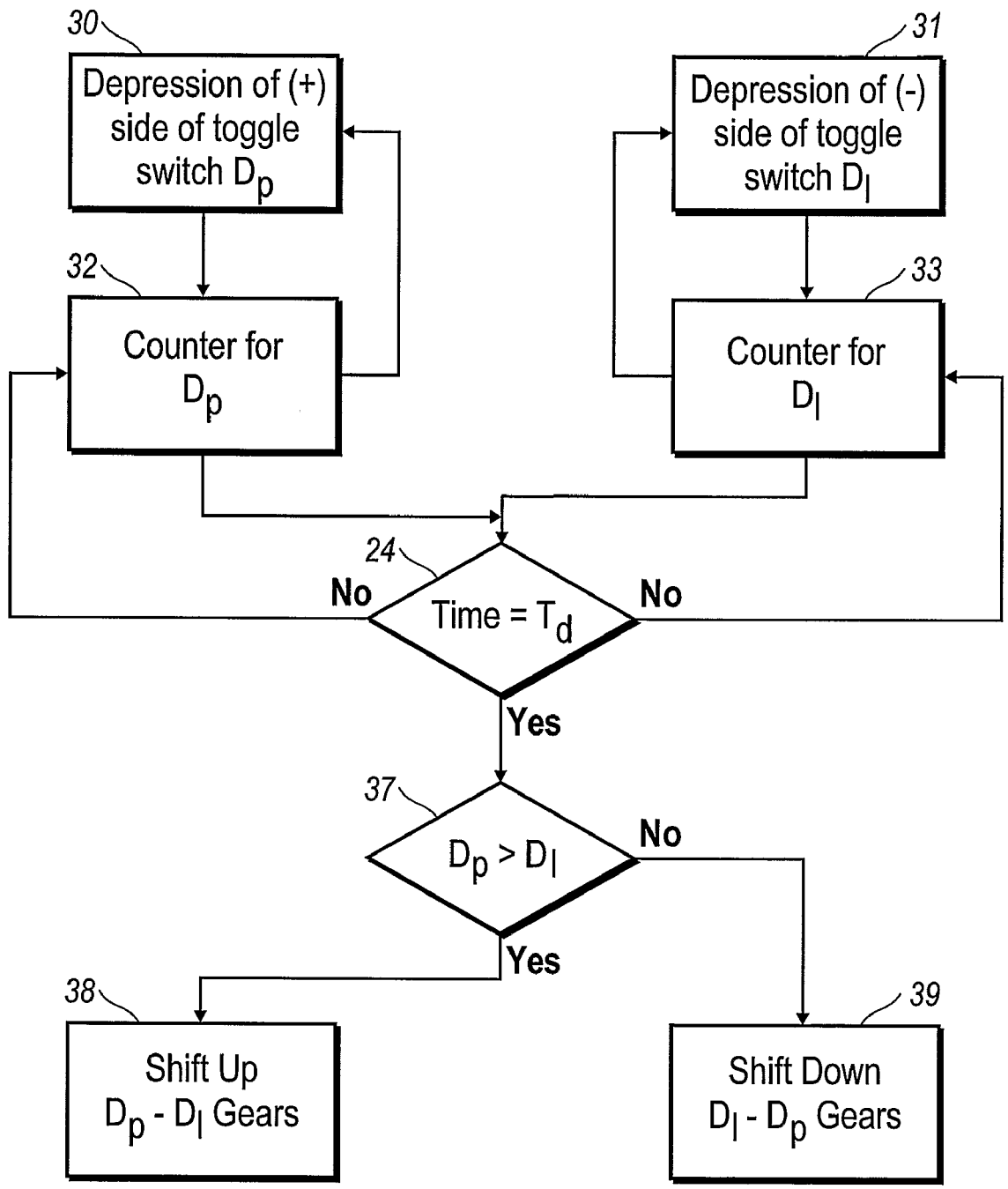
FIG. 3 illustrates a flow diagram of another embodiment.

In one embodiment that is illustrated in FIG. 3, upon the first depression + (30) or − (31) of the toggle switch 12 a time delay is started. If another depression of the toggle switch 12 occurs, two counters (blocks 32, 33) track the number of times the + and − side of the toggle switch are depressed. The counter Dp (block 32) is used for tracking the depressions of the + side (Dp) of the toggle switch. Likewise, the counter Di (block 33) is used for tracking the depressions of the − side (Di) of the toggle switch. When the time delay (block 24) expires, a comparison of the values stored by the counters (blocks 32, 33) is performed. Then a signal is sent to the transmission controller to shift an appropriate number of gears. If there are more depressions of the + side of the toggle switch (block 37), the signal (block 38) that is sent is representative of the total number of times the + side was depressed minus the total number of times the − side was depressed. Likewise, if the number of depressions of − side outnumber that of the + side a representative signal (block 39) of the total number of times the − side was depressed minus the total number of times the + side was depressed is sent to the transmission controller. Alternatively, a single counter that is capable of tracking the total number of depressions can be used. The number of depressions of the + side that are sent to the gearbox indicate the number of shifts in the upward direction (upshifts) desired by the driver. Likewise, the number of − side depressions indicates the number of shifts requested in a downward direction (downshifts).

In another embodiment, the time delay (block 24) starts at the first depression of the toggle switch (block 20) and is reset upon the next depression of the toggle switch (block 20). The counters (blocks 32, 33) track the number of depressions of the + and − side of the toggle switch and relays the sum of the + and − depressions. As described above, this may take place through passing the information along to another piece of software or hardware to determine which direction is indicated by the number of depressions 37. Thus with a time delay of 0.4 seconds, if a depression is made 0.3 seconds after the first depression, it is recorded by the counter and the time delay is restarted for another 0.4 seconds. If a further depression is detected, for instance within 0.2 seconds, the delay is reset. If all the depressions are of the + side of the toggle switch, the gearbox is requested to perform an upshift of three gears. If the first depression was a depression of the − side and the second two depressions were of the + side, the gearbox is controlled to perform an upshift of one gear.

The above described time delay, in a preferred embodiment, is one that can be programmed by the vehicle operator. This can be through a variety of different programming techniques known in the art. A few illustrative examples are provided. With the key in the on position, but with the engine not running, a display is provided to indicate the number of tenths of a second that will be used for the time delay. In another embodiment, the center portion of the toggle switch can be depressed and the time selected via an audible signal with the further depression of the + and − used to adjust the time delay. Once the delay is selected a further depression of the middle portion of the toggle switch acts to confirm the time delay. These are merely provided as examples and other known methods of setting time are within the scope of this disclosure.

Figure 4:
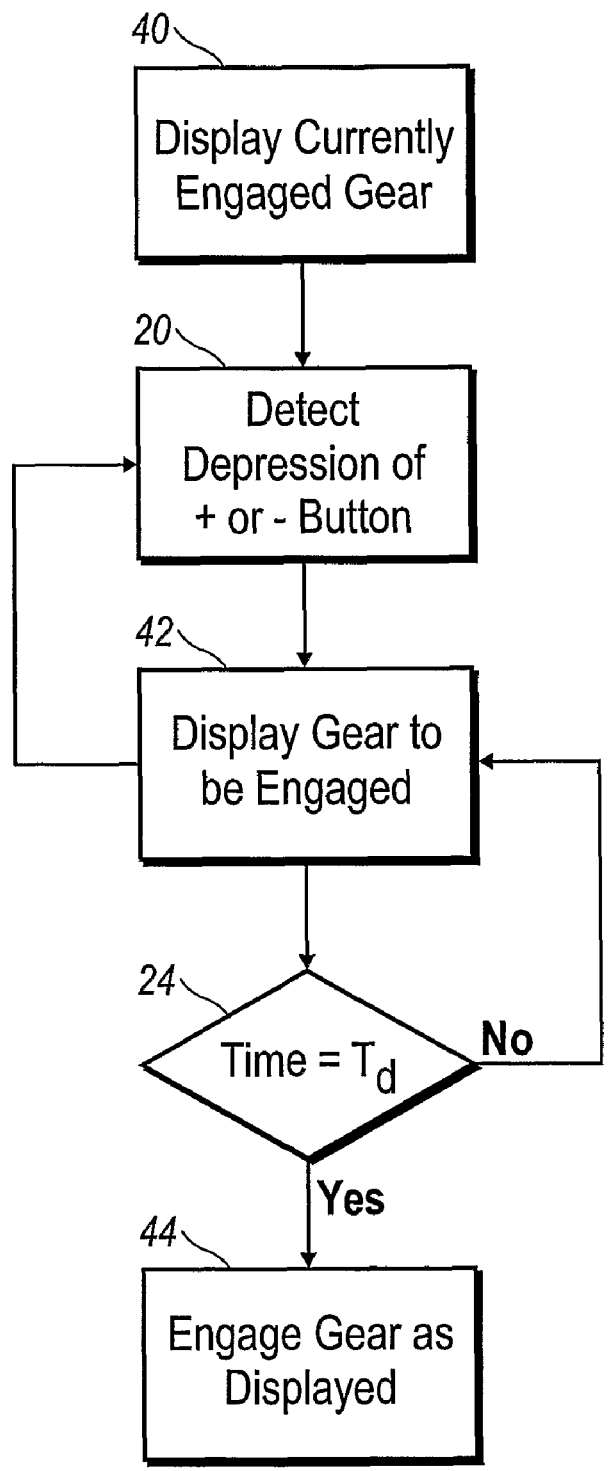
FIG. 4 illustrates a flow diagram of yet another embodiment.

In yet another embodiment as shown in FIG. 4, the repeated depression of the toggle switch either + or − side, will enable a scrolling feature. This feature enables the driver to select the desired gear through the use of a visual display or audible signal. When the driver depresses and holds the + side of the toggle switch (block 20), a display shows the current gear selection (block 40) and while the + side is held depressed the gear display increases an additional gear every 0.1 seconds (block 20). When the driver sees the desired gear indicated on the display (block 42), the driver releases the toggle switch and gear shown in the display is engaged by the transmission control unit (block 44) after a preset time expires (block 24). The transmission unit in one embodiment imposes engine speed or engine bogging limitations. Likewise, the − side of the toggle switch can be used to select a desired gear. Also, in a preferred embodiment, the desired gear can be selected by using both the + and − sides of the toggle switch.

The current gear is displayed in the display unit and upon depression of either the + or − side of the toggle switch the displayed gear begins to move in the desired direction. If the driver passes the desired gear by holding the switch down too long, then the other side of the toggle switch is depressed until the proper gear is shown. This depression of the other side must occur within a predetermined period of time, preferably the delay time before engagement of the gear. If the other side is pressed during the delay period before transmitting the signal to the transmission control unit, then no signal is sent until after the subsequent depression(s) stop and the preset time delay expires. This time delay is the same time delay as described above.

In another embodiment, the indication of the currently selected gear is performed audibly. This audible indication of the gear may be affected using any one of a number of known methods in the art. For example, the current gear selection may be indicated through a series of beeps. In another example, each gear selection in the positive direction (depression of the + side of the toggle switch) is indicated by a high pitch sound and each gear selection in the negative direction (depression of the − side of the toggle switch) is indicated by a lower pitch sound.

In a still further embodiment, holding down the toggle switch causes the current selection to be cancelled. The method of indicating a desired gear cancellation in one embodiment involves the driver depressing the toggle switch in either direction prior to the expiration of the time delay for period of time longer than the time delay.

What is claimed is:

1. A method for communicating a gear shift instruction to a gear box of an automatic mechanical transmission for a heavy vehicle, the method comprising:
   indicating a currently engaged gear;
   detecting one or more gear shift requests from a gear shift selector;
   indicating a currently requested gear; and
   delaying communication of the currently requested gear until a predefined period of time has elapsed,
   wherein the predefined time period is defined by a vehicle operator, and the vehicle operator sets the predefined time by depressing the gear shift selector while the heavy vehicle's engine is not running and ignition is in an on position until a desired time is shown in a display.

2. The method of claim 1, wherein the predefined time period is between 0.3 and second.

3. The method of claim 1, wherein the predefined time period is between 0.3 and 0.6 second.

4. The method of claim 1, wherein the communication delay is prolonged an additional predefined time period if another assertion is made within the predefined time from the last assertion.

5. The method of claim 1, wherein the predefined period of time is reset if a further assertion is made within the predefined period of time.

6. The method as in claim 5, wherein the further assertion can be either in a same direction as the previous assertions or in an opposite direction.

7. The method of claim 1, wherein the method of indicating the currently engaged gear is via a visual display or audible alert.

8. The method of claim 7, wherein the visual display is a display in which the currently engaged gear is indicated by numbers.

9. The method of claim 7, wherein the audible alert comprises two distinct tones, one signifying an upshift request and one signifying a downshift request.

10. The method of claim 7, wherein the audible alert is one in which an upshift is indicated by a high pitch tone and a downshift is indicated by a low pitch tone.

* * * * *